United States Patent
Nakagami

(10) Patent No.: US 9,076,037 B2
(45) Date of Patent: Jul. 7, 2015

(54) IMAGE PROCESSING APPARATUS AND METHOD

(71) Applicant: JVC KENWOOD Corporation, Yokohama-shi, Kanagawa (JP)

(72) Inventor: Atsushi Nakagami, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 14/284,852

(22) Filed: May 22, 2014

(65) Prior Publication Data

US 2015/0003675 A1    Jan. 1, 2015

(30) Foreign Application Priority Data

Jun. 28, 2013  (JP) .................................. 2013-135967
Jan. 27, 2014  (JP) .................................. 2014-012250

(51) Int. Cl.
*G06K 9/00* (2006.01)
*G06K 9/46* (2006.01)

(52) U.S. Cl.
CPC .............. *G06K 9/00523* (2013.01); *G06K 9/46* (2013.01)

(58) Field of Classification Search
CPC .................... G08B 13/19608; G08B 13/19606; G08B 13/1961; G08B 13/19602; G06T 7/20; G06T 2207/10016; G06T 2207/20148; G06T 2207/20224; G06K 9/00268; G06K 9/00523; G06K 9/46

USPC .......................................... 382/103
See application file for complete search history.

(56) References Cited

U.S. PATENT DOCUMENTS

| 2007/0269135 | A1* | 11/2007 | Ono .............................. 382/276 |
| 2008/0123747 | A1* | 5/2008 | Lee et al. ................. 375/240.16 |
| 2009/0226093 | A1* | 9/2009 | Guo et al. ..................... 382/190 |
| 2010/0208986 | A1* | 8/2010 | Cobb et al. .................... 382/165 |

FOREIGN PATENT DOCUMENTS

JP    2000-059669 A    2/2009

* cited by examiner

Primary Examiner — Stephen R Koziol
Assistant Examiner — Shaghayegh Azima
(74) Attorney, Agent, or Firm — Nath, Goldberg & Meyer; Jerald L. Meyer

(57) ABSTRACT

A background image holding unit is configured to hold a background image. A threshold table holding unit is configured to hold a threshold. A previous frame image holding unit is configured to hold a previous frame image. An object extraction unit is configured to perform a background subtraction process of calculating difference values between the background image and a latest image and detecting a pixel whose calculated difference value is equal to or larger than the threshold as an extracted object, and configured to perform a process of judging the magnitude of difference between the background image and latest image. The object extraction unit is configured to update the background image and threshold in accordance with the magnitude of difference between the background image and latest image.

4 Claims, 9 Drawing Sheets

FIG. 3

| THRESHOLD TYPE | THRESHOLD VALUE |
|---|---|
| DEFAULT THRESHOLD VALUE | 30 |
| MINIMUM THRESHOLD VALUE | 10 |

IMAGE PROCESSING APPARATUS AND METHOD

CROSS REFERENCE TO RELATED APPLICATION

This application is based upon and claims the benefit of priority under 35 U.S.C. §119 from Japanese Patent Application No. 2013-135967, filed on Jun. 28, 2013 and No. 2014-012250, filed on Jan. 27, 2014, the entire contents of both of which are incorporated herein by reference.

BACKGROUND

The present disclosure relates to an image processing apparatus and an image processing method which detect an object by using an image processing technique based on background subtraction.

In conventional surveillance camera systems, a surveillant checks video taken by a surveillance camera to detect abnormalities. However, with the development of image processing techniques in recent years, there has been an increase in the number of surveillance camera systems which automatically detect objects with surveillance cameras or image processing apparatuses connected to surveillance cameras. Such systems provide alarm displays or alarm notifications by e-mail when abnormalities occur.

Even when an abnormality occurs, the abnormality might not be detected by the surveillance methods in which the surveillant checks the video manually because of carelessness or insufficient surveillance skill. On the other hand, surveillance methods using image processing can make an improvement in the above-described defects and can save manpower, thus they are being increasingly introduced.

One of the methods which automatically detect objects, background subtraction, is widely and generally used. The background subtraction stores a previously-captured background image which does not include an anomaly and extracts the foreground part based on the difference between the current image and the background image.

However, it is sometimes difficult to accurately capture an object because of the location conditions of the surveillance camera, the weather thereof, and the like. Especially when the surveillance camera is installed outdoors, the surveillance camera is influenced by light changes due to weather conditions. Accordingly, it is necessary to capture an object by properly and continuously updating the background image.

While there is a demand for automatic detection of abnormalities through image processing for surveillance camera images as described above, surveillance methods using image processing set off many false alarms due to false detection. Accordingly, there is a need for a method which detects an object with high accuracy.

Especially outdoors, the sun may be blocked by clouds and then come out again, causing quick changes in sunlight in some cases, where the entire image is different from the background image, thus making it difficult to detect an object.

In the light of the aforementioned problem, Japanese Patent Laid-open Publication No. 2000-59669 (Patent Literature 1) discloses an image processing apparatus which updates the background image when optical parameters change.

SUMMARY

However, in the technique of Patent Literature 1, when the image of an object changes in brightness, the entire background image before the change in brightness is updated to a newly taken image. Accordingly, in the case where a moving object is included in the image taken when the light intensity of the entire image greatly changes because of a temporary change in sunlight, the background image is updated with the image including the moving object. In this case, when the object moves, the area where the moving object is located before the movement can be falsely detected as an object to be detected.

If the background image is not appropriately updated, it is difficult to detect a new moving object with high accuracy, thus leading to low detection accuracy.

An object of the embodiments is to provide an image processing apparatus and an image processing method which detect an object with increased accuracy.

A first aspect of the embodiments provides an image processing apparatus comprising: a background image holding unit holding a background image; a threshold table holding unit holding a threshold; a previous frame image holding unit holding a previous frame image which is a frame image temporally prior to the latest image; and an object extraction unit which performs a background subtraction process of calculating difference values between the background image and latest image and detects a pixel whose calculated difference value is not less than the threshold as an extracted object and a process of judging the magnitude of difference between the background image and latest image, wherein the object extraction unit is configured to, when determining that the magnitude of difference between the background image and latest image is less than a predetermined value, update the background image by adding the latest image to the background image in a predetermined ratio; when determining that the magnitude of difference between the background and latest image is not less than the predetermined value, update the threshold by calculating a difference average which is the average of the difference values between the previous frame image and the latest image and adding the absolute value of the calculated difference average to the threshold; update the background image by replacing the pixels of the latest image which are not recognized as the extracted object as the result of execution of the background subtraction process using the updated threshold, for the corresponding pixels of the background image as pixels of a new background image and replacing pixels of the background image corresponding to the pixels which are recognized as the extracted object with the pixels obtained by adding the difference average to the background image as pixels of the new background image; the background image holding unit holds the background image updated by the object extraction unit instead of the background image that the background image holding unit has held until that time; and the threshold table holding unit holds the threshold updated by the object extraction unit instead of the threshold that the threshold table holding unit has held until that time.

A second aspect of the embodiments provides an image processing method, comprising: calculating difference values between a background image and a latest image; detecting a pixel whose calculated difference value is not less than a predetermined threshold as an extracted object; judging the magnitude of difference between the background image and the latest image based on the difference values; when determining that the magnitude of difference between the background image and the latest image is less than a predetermined value, updating the background image by adding the background image to the latest image in a predetermined ratio; when determining that the magnitude of difference between the background and the latest image is not less than the predetermined value, updating the threshold by calculating a difference average which is the average of the difference value of each pixel between the previous frame image and the latest image and adding the absolute value of the calculated difference average to the threshold; and updating the background image by replacing the pixels of the latest image which are not recognized as the extracted object as the result of execution of the background subtraction process using the updated threshold, for the corresponding pixels of the background image as pixels of a new background image and replacing the pixels of the background image corresponding to the pixels which are recognized as the extracted object in the latest image, with pixels obtained by adding the difference average to the background image as pixels of the new background image.

BRIEF DESCRIPTION OF THE DRAWINGS

FIG. 3 is a table showing the threshold types and values.

DETAILED DESCRIPTION

Hereinafter, a description is given of embodiments with reference to the drawings.

Figure 1:
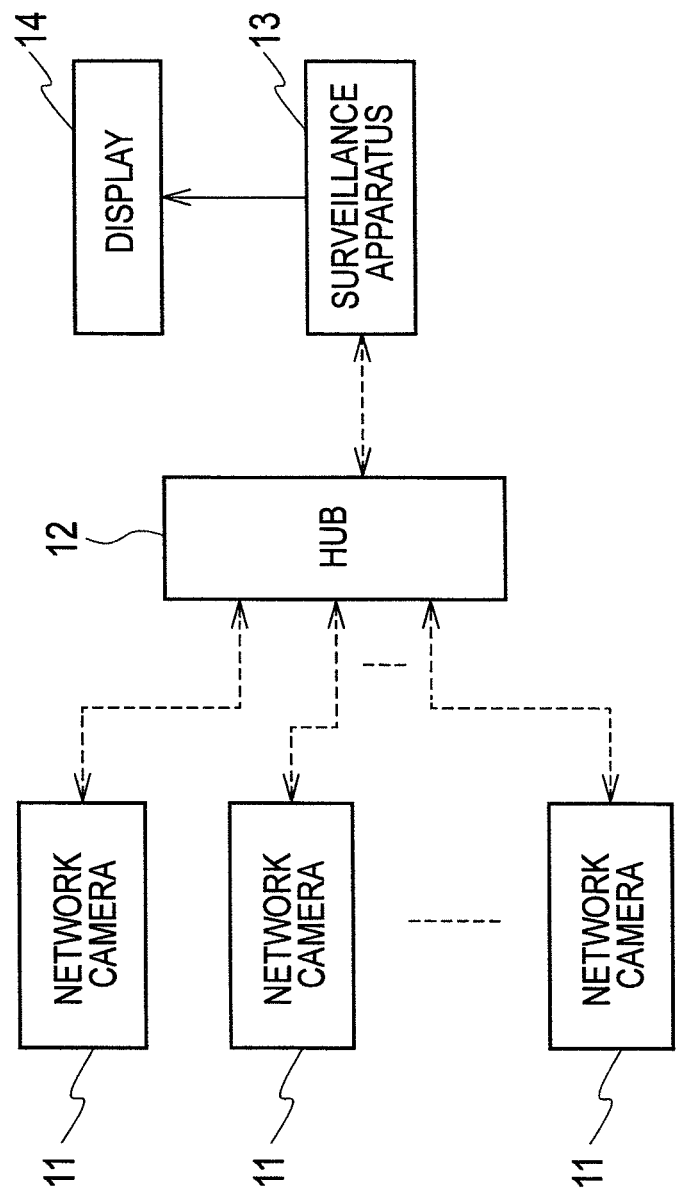
FIG. 1 is a block diagram showing the configuration of a network camera surveillance system including an image processing apparatus according to at least one embodiment.

In FIG. 1, an image processing apparatus of the embodiments is provided for each of the network cameras 11, for example. Each network camera 11 is configured to detect an object newly imaged in the background image as an object to be detected (hereinafter, also referred to as an extracted object) for surveillance of entry of anomalies and the like. The extracted object is detected using a publicly-known image processing method called background subtraction.

A normal network camera surveillance system includes a plurality of network cameras 11, a hub 12, a surveillance apparatus 13, and a display 14. The surveillance system does not need to include a plurality of network cameras 11 and needs to include at least one network camera 11.

The hub 12 connects the plurality of network cameras 11 and the surveillance apparatus 13 via a LAN and transmits signals between the surveillance apparatus 13 and each of the plurality of network cameras 11.

The surveillance apparatus 13 uses IP addresses to identify the plurality of network cameras 11 with which the surveillance apparatus 13 communicates. The surveillance apparatus 13 receives data of images taken by the network cameras 11 using the TCP/IP protocol or the like.

The surveillance apparatus 13 adjusts and controls the imaging requirements such as the diaphragm and the imaging direction of each network camera 11 taking an image and gives the imaging requirements to the network camera 11. The surveillance apparatus 13 stores data of the images taken by the network cameras 11 in a built-in storage device when necessary. The surveillance apparatus 13 causes the display 14 to display the images taken by the network cameras 11.

The display 14 displays the images taken by the network cameras 11 under the control of the surveillance apparatus 13.

Figure 2:
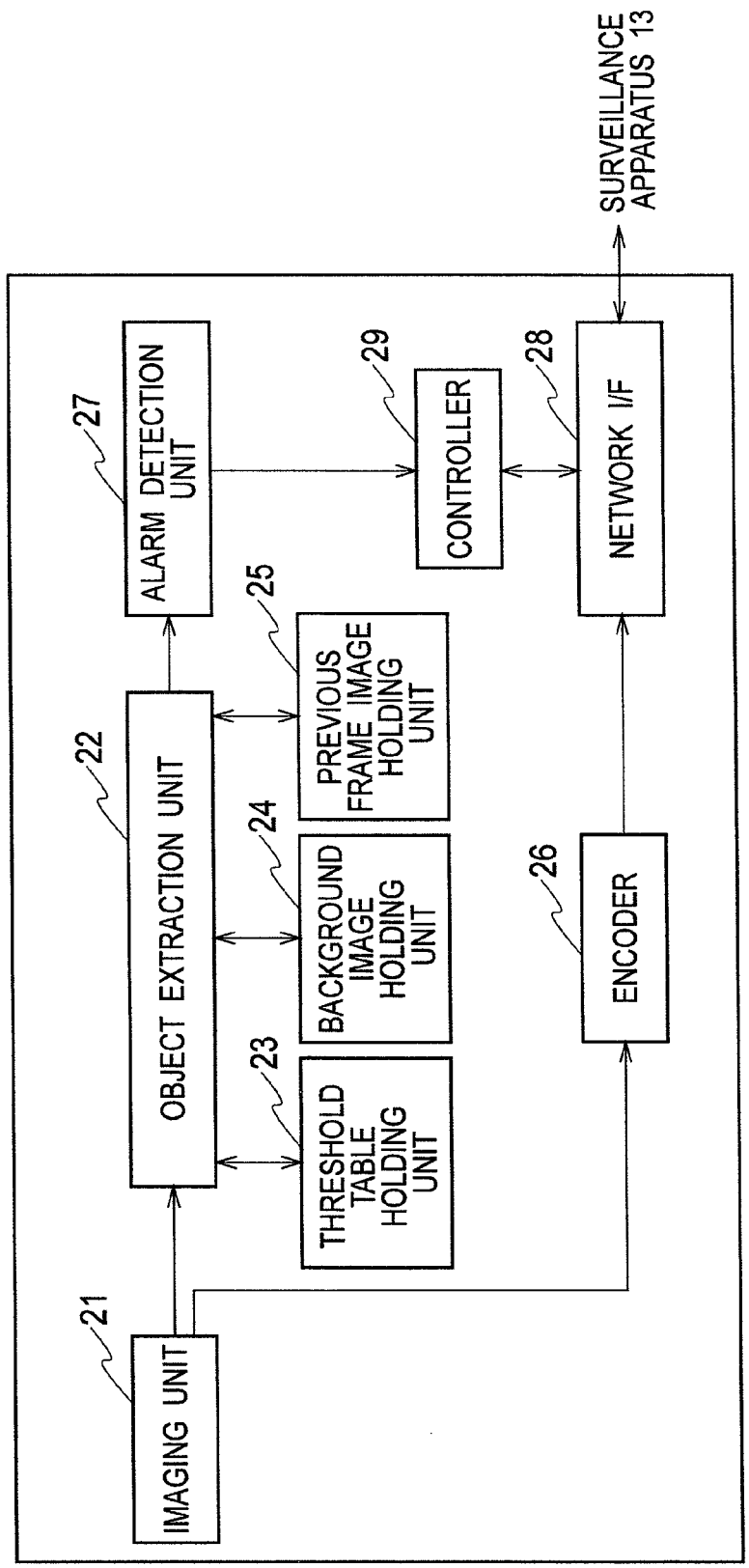
FIG. 2 is a block diagram showing the configuration of a network camera 11.

All of the pluralities of network cameras 11 have the same configuration as illustrated in FIG. 2.

In FIG. 2, each network camera 11 is a camera which includes a wired or wireless LAN function and is capable of taking a motion picture in color.

The network camera 11 includes an imaging unit 21, an object extraction unit 22, a threshold table holding unit 23, a background image holding unit 24, and a previous frame image holding unit 25. The object extraction unit 22, threshold table holding unit 23, background image holding unit 24, and previous frame image holding unit 25 constitute an image processing apparatus of the embodiments.

The image processing apparatus can be implemented by a microcomputer, for example, which controls various operation processes based on a program. The image processing apparatus gives instructions to the aforementioned constituent elements included in the image processing apparatus based on a control logic (program) previously included inside to integrally manage all the operations necessary for a background subtraction process described later.

The network camera 11 further includes an encoder 26, an alarm detection unit 27, a network I/F (interface) 28, and a controller 29.

The imaging unit 21 is configured to take an image of an imaging target view and acquires electric signals corresponding to the taken image from a CCD sensor or the like to generate image data.

The object extraction unit 22 receives the image data generated by the imaging unit 21 and, in the background subtraction process, detects the extracted object based on images taken by the imaging unit 21. The object extraction unit 22 performs a process of correcting and updating the background image and the threshold. The object extraction unit 22 corrects and updates the background image and threshold by a method in accordance with the proportion of the number of pixels detected as the extracted object to all the pixels of the latest frame image.

When the proportion of the number of pixels detected as the extracted object to all the pixels of the latest frame image is less than a predetermined proportion, the object extraction unit 22 corrects and updates the background image by adding the background image to the latest frame image in a predetermined ratio for each pixel whose absolute value of the difference value obtained by the background subtraction is equal to or smaller than the threshold.

In a similar manner, for each pixel whose absolute value of the difference value obtained by the background subtraction is equal to or smaller than the threshold, the object extraction unit 22 corrects and updates the threshold of each pixel by adding the current threshold to the absolute value of the difference value in a predetermined ratio.

When the proportion of the number of pixels detected as the extracted object to all the pixels of the latest frame image is equal to or larger than the predetermined proportion, the object extraction unit 22 calculates a difference average which is the average of difference values between the latest frame image and a previous frame image held in the previous frame image holding unit 25.

The object extraction unit 22 corrects and updates the threshold by adding the current threshold to the absolute value of the calculated difference average. The object extraction unit 22 executes the background subtraction process using the updated threshold.

The object extraction unit 22 replaces the pixels recognized as the background in the background subtraction process using the updated threshold with the corresponding pixels of the latest frame image and updates the pixels recognized as the extracted object by adding the calculated difference average thereto.

When the proportion of the number of pixels detected as the extracted object to all the pixels of the latest frame image is equal to or larger than the predetermined proportion, the object extraction unit 22 calculates the difference values between the latest frame image and the previous frame image held by the previous frame image holding unit 25 for each pixel and obtains the average of the calculated difference values of the pixels of the latest frame image as the difference average.

In this process, the object extraction unit 22 removes the pixels having the largest difference values from the objects of difference average calculation and calculates the difference average for the residual pixels. Herein, the number of removed pixels is previously set based on the number of pixels of the extracted object.

The threshold table holding unit 23 holds threshold values used in detecting the extracted object in the background subtraction process by the object extraction unit 22. The threshold table holding unit 23 holds a default threshold value and a minimum threshold value shown in FIG. 3.

Back to FIG. 2, the threshold table holding unit 23 gives the held threshold values to the object extraction unit 22. The threshold table holding unit 23 receives the threshold updated by the object extraction unit 22 and holds the updated threshold instead of the threshold that the threshold table holding unit 23 has held until that time.

The threshold held in the threshold table holding unit 23 and the background image held in the background image holding unit 24 are automatically set at the start of each network camera 11 and are also changed and updated according to control instructions from the surveillance apparatus 13.

At the start of the object extraction process, the default threshold value which is held by the table holding unit 23, a value of 30, for example, is used. The threshold may have different values for R, G, and B of each pixel.

At the start of the object extraction process, all the thresholds for the R, G, and B values are set to the default threshold value. When a later-described process of correcting the threshold is executed after the start of the object extraction process, the thresholds for the R, G, and B values are individually corrected for each pixel for control of the sensitivity of object extraction.

The smaller the threshold, the higher the sensitivity. The pixels are then more likely to be recognized as the extracted object, and the object extraction is more susceptible to the influence of noise or the like.

The values held in the threshold table holding unit 23 shown in FIG. 3 are set depending on the location conditions of the network camera 11. To be specific, the above values are set after the object detection conditions are checked according to an instruction given by the surveillance apparatus 13.

The minimum threshold value is the minimum value that can prevent an influence of noise and is set to 10, for example. The default threshold value is set larger than the minimum threshold value so as to provide a larger allowance for the sensitivity than the minimum threshold value does. The default threshold value is set to the aforementioned value (30), for example. After the object extraction process starts, at a pixel which continues to have a small difference value between the background image and the extracted object, the threshold is corrected so as to be gradually reduced in a range not less than the minimum threshold value of the threshold table holding unit 23 by a later-described method.

The background image holding unit 24 holds the background image which is used in the process of detecting the extracted object by the background subtraction process in the object extraction unit 22. The background image holding unit 24 gives the held background image to the object extraction unit 22. The background image holding unit 24 receives the background image updated in the object extraction unit 22 and holds the updated background image instead of the background image that the background image holding unit 24 has held until that time.

The previous frame image holding unit 25 holds an image of a frame previous to the latest frame (the image is referred to as a previous frame image). The previous frame image held by the previous frame image holding unit 25 is used in the threshold correction process which is performed when the number of pixels of the extracted object is equal to or larger than the predetermined proportion of all the pixels as the results of the background subtraction process.

The previous frame image holding unit 25 gives the held previous frame image to the object extraction unit 22. The previous frame image holding unit 25 receives the latest frame image updated by the object extraction unit 22 and holds the updated latest frame image instead of the previous frame image that the previous frame image holding unit 25 has held until that time.

The encoder 26 receives image data obtained by the imaging unit 21 and encodes the received image data to compressed data such as JPEG data. The encoder 26 gives the compressed image data to the network I/F 28.

The alarm detection unit 27 performs a process of detecting whether an extracted object has entered the image of the imaging target view based on the results of detection of the extracted object performed by the object extraction unit 22. The alarm detection unit 27 issues an alarm to notify the controller 29 when detecting the entry of an anomaly.

The network I/F 28 connects the network cameras 11 and the surveillance apparatus 13 via the hub 13.

The controller 29 functions as a control center controlling the operation of the network cameras 11. The controller 29 gives a control signal to each constituent element of each network camera 11 and integrally manages and controls all the operations necessary for the operation of the network camera 11.

FIG. 2 does not show connections including an internal bus through which control signals are transmitted.

In the above-described configuration, the image data generated by the imaging unit 21 is subjected to the process of extracting the extracted object through the background subtraction process in the object extraction unit 22. The information, including the position, size, and the like, of the extracted object extracted by the object extraction unit 22 is given to the alarm detection unit 27.

The alarm detection unit 27 detects an entering object or the like based on the results of the extraction of the extracted object which are given from the object extraction unit 22. When there is an abnormality such as detection of an entering object, the alarm detection unit 27 notifies the controller 29 of the occurrence of an alarm. The controller 29 notifies the surveillance apparatus 13 of the alarm via the network I/F.

Figure 4:
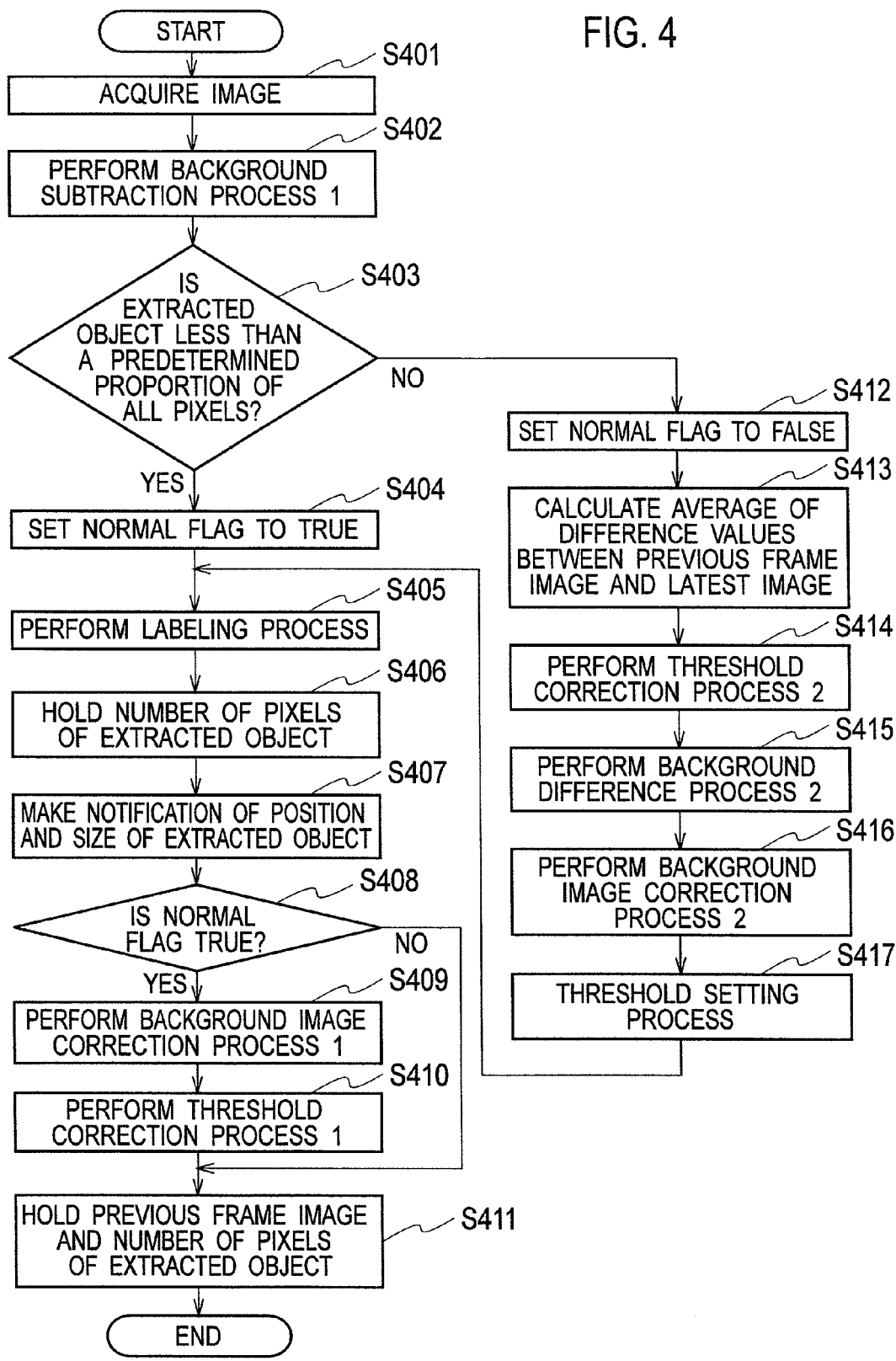
FIG. 4 is a flowchart showing a processing procedure of an image processing method according to at least one embodiment.

FIG. 4 is a flowchart showing a procedure of the object extraction process performed in the object extraction unit 22.

The procedure shown in the flowchart of FIG. 4 is repeatedly executed according to the previously set cycle.

Before the process shown in the flowchart of FIG. 4 starts, an initial background image held by the background image holding unit 24 is set to an image which has good conditions and does not include any extracted object in accordance with the instruction previously given from the surveillance apparatus 13.

Some image processing methods performing background subtraction use the brightness as the pixel value used in calculation of the difference values (dissimilarity), but the embodiments use R (red), B (blue), and G (green) values, which are each represented by a value within a range of 256 gradations from 0 to 255 in 8-bit data, for example.

In FIG. 4, the object extraction unit 22 first acquires the date of the latest frame image taken by the imaging unit 21 in step S401.

The object extraction unit 22 executes a background subtraction process 1 for the acquired latest frame image in step S402. In the background subtraction process 1, the difference values between the latest frame image and the background image held by the background image holding unit 24 are calculated for each image data pixel. When all of the absolute values of the difference values for the R, G, and B values at each pixel of the latest frame image from the background image are less than the respective threshold values, the pixel of interest is recognized as the background.

On the other hand, when any one of the absolute values of the calculated difference values of each pixel is equal to or larger than the threshold, it is recognized that the latest frame image includes an extracted object, and the latest frame image is binarized. To be specific, the latest frame image is binarized by setting the pixels recognized as the extracted object to 1 and setting the other pixels not recognized as the extracted object to 0 into a binarized image in which the pixels recognized as the extracted object and the pixels not recognized as the extracted object are distinguished from each other.

The binarized image data is held in the object extraction unit 22. Moreover, the difference values of the R, G, and B values of each pixel are held in the object extraction unit 22 for a later-described process of changing or correcting the threshold.

In step S403, the object extraction unit 22 judges the magnitude of difference between the latest frame image and the background image held by the background image holding unit 24 as the results of the background subtraction process 1 executed in previous step S402. To be specific, the object extraction unit 22 determines whether the extracted object is less than a previously set proportion, 75%, for example, of the entire image previously set. When the extracted object is less than the predetermined proportion as the results of the above determination, the process shown in step S404 is executed, otherwise, the process shown in step S412 is executed.

In step S404, the object extract unit 22 sets a normal flag to True indicating that the process subsequently executed is a normal process.

In step S405, the object extraction unit 22 executes a labeling process. At the labeling process, the binarized image data which is obtained as the results of the background subtraction process and held in the background subtraction process 1 executed in the previous step S402 is subjected to erosion and dilation for noise removal and image shaping. This processing is generally called morphological image processing but does not directly relate to the embodiments, and the detailed description thereof is omitted.

The labeling process is performed to detect connected components of white pixels of the image data binarized into black and white, for example, to determine the position and size of the extracted object.

In step S406, the object extraction unit 22 calculates the number of pixels of the extracted object after the labeling process. The calculated number of pixels of the extracted object is held in the object extraction unit 22.

In step S407, the object extraction unit 22 notifies the alarm detection unit 27 of the detected information including the position and size of the extracted object obtained by the labeling process. Based on the detected information, the alarm detection unit 27 detects entry of the extracted object and the like into the image taken by the network camera 11.

In step S408, the object extraction unit 22 determines whether the normal flag is set to True. When the normal flag is set to True as the result of the determination, the process shown in step S409 is executed. On the other hand, when the normal flag is not set to True, the process shown in step S411 is executed.

In step S409, the object extraction unit 22 executes a background image correction process 1. In the background image correction process 1, for each pixel of the background image recognized as the background by the background subtraction process 1 executed in the previous step S402, the background image is added to the latest frame image to be combined in a ratio of 99:1, for example.

Figure 5:
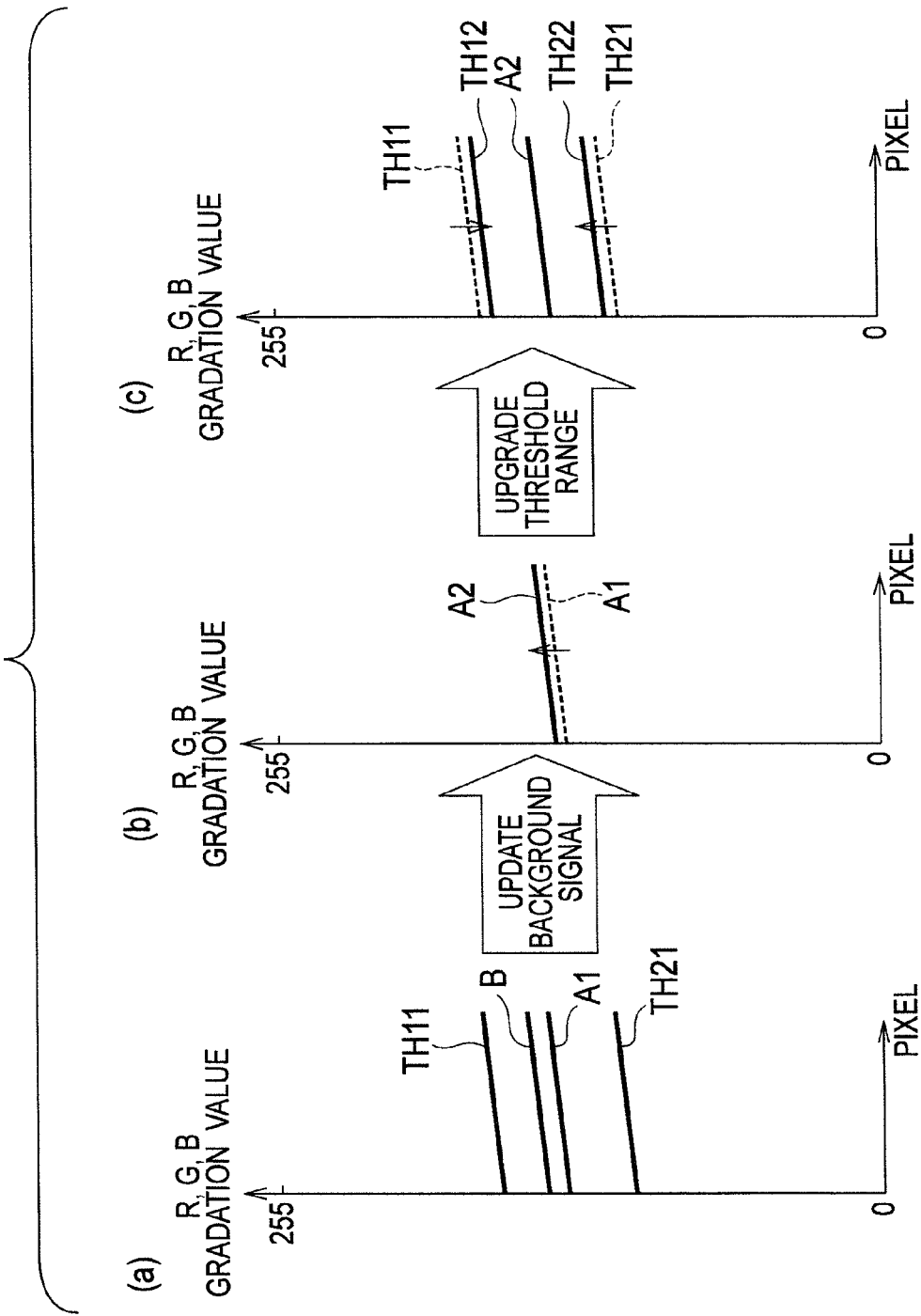
FIG. 5 is a diagram showing an example of updating of the R, G, or B value of the background image and an example of updating of the threshold in the case where the number of pixels of the extracted object is not less than a predetermined proportion of all the pixels.

Herein, it is assumed that the R, G, or B value of the background image, the R, G, or B value of the latest frame image, and the current threshold have a relationship shown in (a) of FIG. 5, for example. In (a) of FIG. 5, reference character A1 indicates the R, G, or B value of the background image; reference character B indicates the R, G, or B value of the latest frame image; and reference character TH11 or TH21 indicates the current threshold.

The threshold TH11 indicates a value larger than the R, G, or B value A1 of the background image by the default value of 30, for example. In (a) of FIG. 5, when the R, G, or B value B of a certain pixel of the latest frame image is larger than the threshold TH11, the pixel of interest is recognized as the extracted object with respect to the background image.

On the other hand, the threshold value TH21 indicates a value smaller than the R, G, or B value A1 of the background image by the default value of 30, for example. In (a) of FIG. 5, when the R, G, or B value B of a certain pixel of the latest frame image is smaller than the threshold value TH21, the pixel of interest is recognized as the extracted object with respect to the background image.

When the background image and latest frame image are added up and combined in the aforementioned ratio in the case as shown in (a) of FIG. 5, the R, G, or B value A1 of the background image is corrected to R, G, or B value of the combined image as shown in (b) of FIG. 5, for example. The background image is thus updated to a new background image. By updating the background image in the aforementioned manner, the influences of noise and the like can be reduced.

Back to FIG. 4, in step S410, the object extraction unit 22 executes the threshold correction process 1. The threshold correction process 1 corrects the threshold by adding and combining the current threshold and the absolute value of the difference value of each pixel in a predetermined ratio of 99:1, for example. The current threshold is thus updated to a new value. However, the threshold is limited so as not to become smaller than the aforementioned minimum threshold value. This is because when the threshold of a pixel becomes small and the sensitivity thereof increases too high, the pixel becomes more likely to be recognized as the extracted object.

When the current threshold TH11 or TH21 is set as shown in (a) of FIG. 5, for example, the absolute value of the current threshold is corrected as shown in (c) of FIG. 5, for example. In other words, the current threshold TH11 is corrected to a new threshold TH12, and the threshold TH21 is corrected to a new threshold TH22. The current threshold is thus updated to a new value.

By correcting the threshold in such a manner, the threshold has different values for the R, G, and B values of each pixel.

Back to FIG. 4, in step S411, the object extraction unit 22 holds the current image in the previous frame image holding unit 25 in order to correct the threshold in the background subtraction process for the next frame when the extracted object is equal to or larger than the predetermined proportion of all the pixels. Moreover, in the step S411, the object extraction unit 22 stores the number of pixels of the extracted object calculated in the previous step S406 and terminates the series of processing.

On the other hand, when the extracted object is not less than the predetermined proportion, that is equal to or larger than the predetermined proportion as the results of the determination shown in the previous step S403, the object extraction unit 22 recognizes that the latest frame image has changed over all with respect to the background image. In this case, the object extraction unit 22 proceeds to step S412 and sets the normal flag to False.

Figure 6:
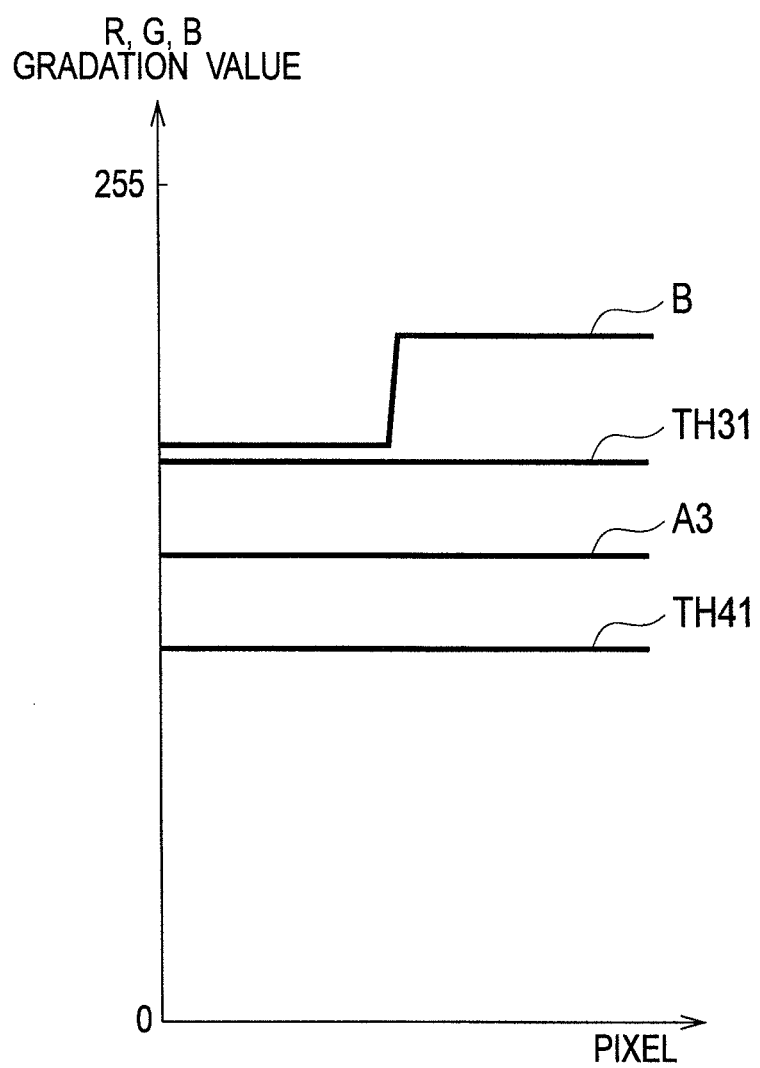
FIG. 6 is a diagram showing an example of R, G, or B values the background and latest frame images and thresholds in the case where the number of pixels of the extracted object is not less than the predetermined proportion of all the pixels.

In this state, the R, G, or B value of the background image, the R, G, or B value of the latest frame image, and the current threshold have a relationship as shown in FIG. 6, for example. In FIG. 6, reference character A3 indicates the R, G, or B value of the background image; reference character B indicates the R, G, or B value of the latest frame image; and reference character TH31 or TH41 indicates the current threshold.

Back to FIG. 4, in step S413, the object extraction unit 22 calculates the average of difference values between the latest frame image and the previous frame image held in the previous frame image holding unit 25. In this process, if there is an extracted object in the latest frame image, the calculated difference values are large at the pixels of the extracted object in some cases.

The number of pixels affected as described above depends on the location conditions of the network camera 11, the lens's focal length, the position, moving direction, and speed of the extracted object, and the like.

For example, it is assumed that the extracted object is at a certain distance from the network camera 11, the image size of the extracted object does not greatly change in a certain frame and a frame previous thereto, and the extracted object is located in both frames in such a manner that the position of the extracted object in a certain frame does not overlap that in the previous frame. In this case, the number of pixels whose difference values calculated as described above are large is about twice the number of pixels of the extracted object.

With consideration for the above assumption, in the results of the calculation of the differences between the latest frame image and previous frame image, the pixels having the largest difference values are removed, and the number of pixels removed is equal to twice the number of pixels of the extracted object held by the previous step S411. The pixels remaining after the above processing are subjected to calculation of the difference values, and the calculated difference values are averaged.

Figure 7:
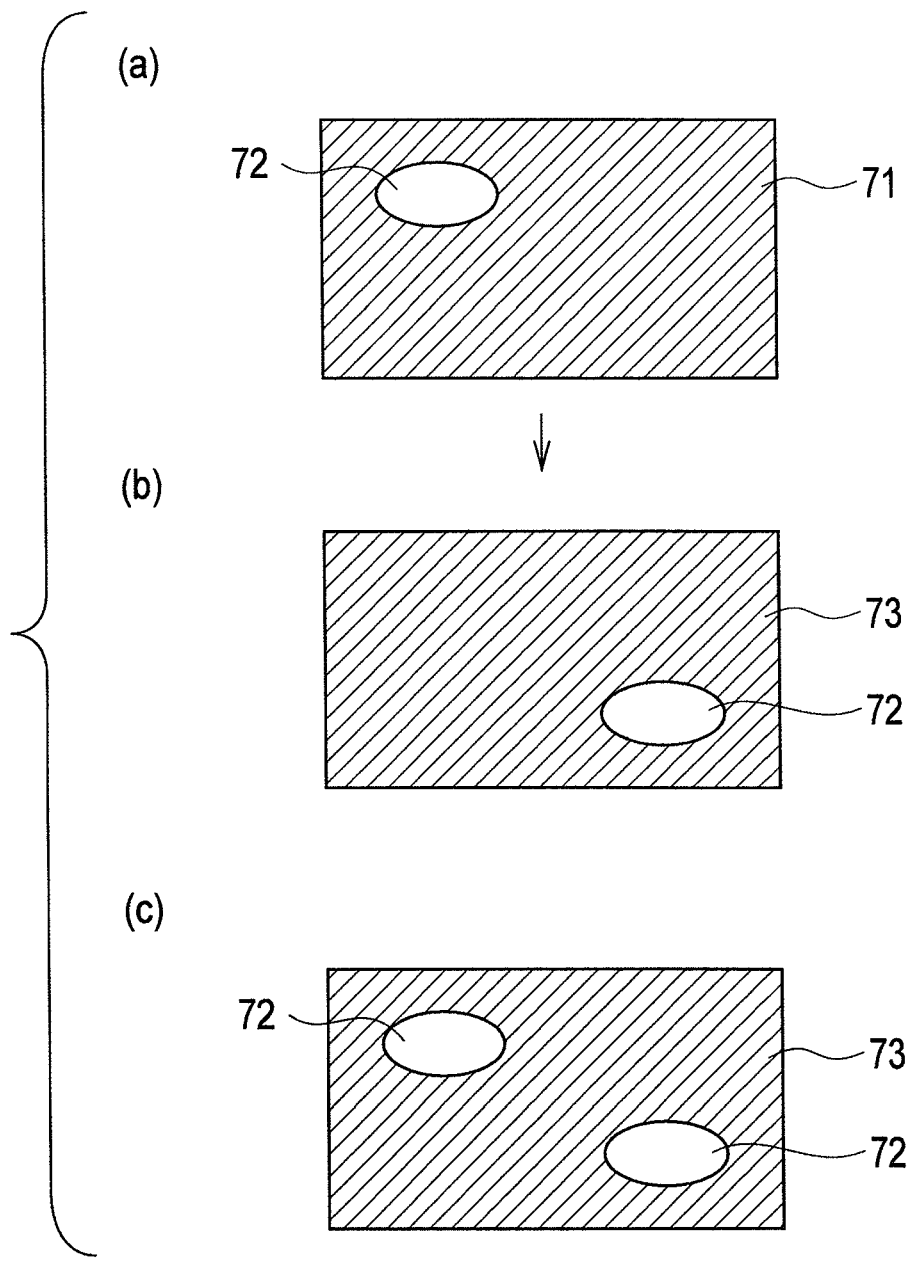
FIG. 7 is a view for explaining calculation of the average of difference values between the previous frame image and the latest frame image.

For example, it is assumed that there is an extracted object 72 indicated by a white ellipse in a previous frame image 71 as illustrated in (a) of FIG. 7 and the extracted object 72 has moved in the current frame image 73 as illustrated in (b) of FIG. 7.

In this case, as illustrated in (c) of FIG. 7, the pixels having the largest difference values are removed, and the number of removed pixels is equal to the sum of the number of pixels of the extracted object 72 illustrated in (a) of FIG. 7 and the number of pixels of the extracted object 72 illustrated in (b) of FIG. 7. After the above processing, the difference values of the residual pixels are calculated, and the calculated difference values are averaged. This can reduce the influence of the movement of the extracted object.

Back to FIG. 4, in step S414, the object extraction unit 22 executes a threshold correction process 2. In the threshold correction process 2, the current threshold is added with the absolute value of the difference average calculated in the previous step S413 to be corrected to new values. Accordingly, the threshold can be updated to a threshold which can be adapted to the illumination of the entire image.

Figure 8:
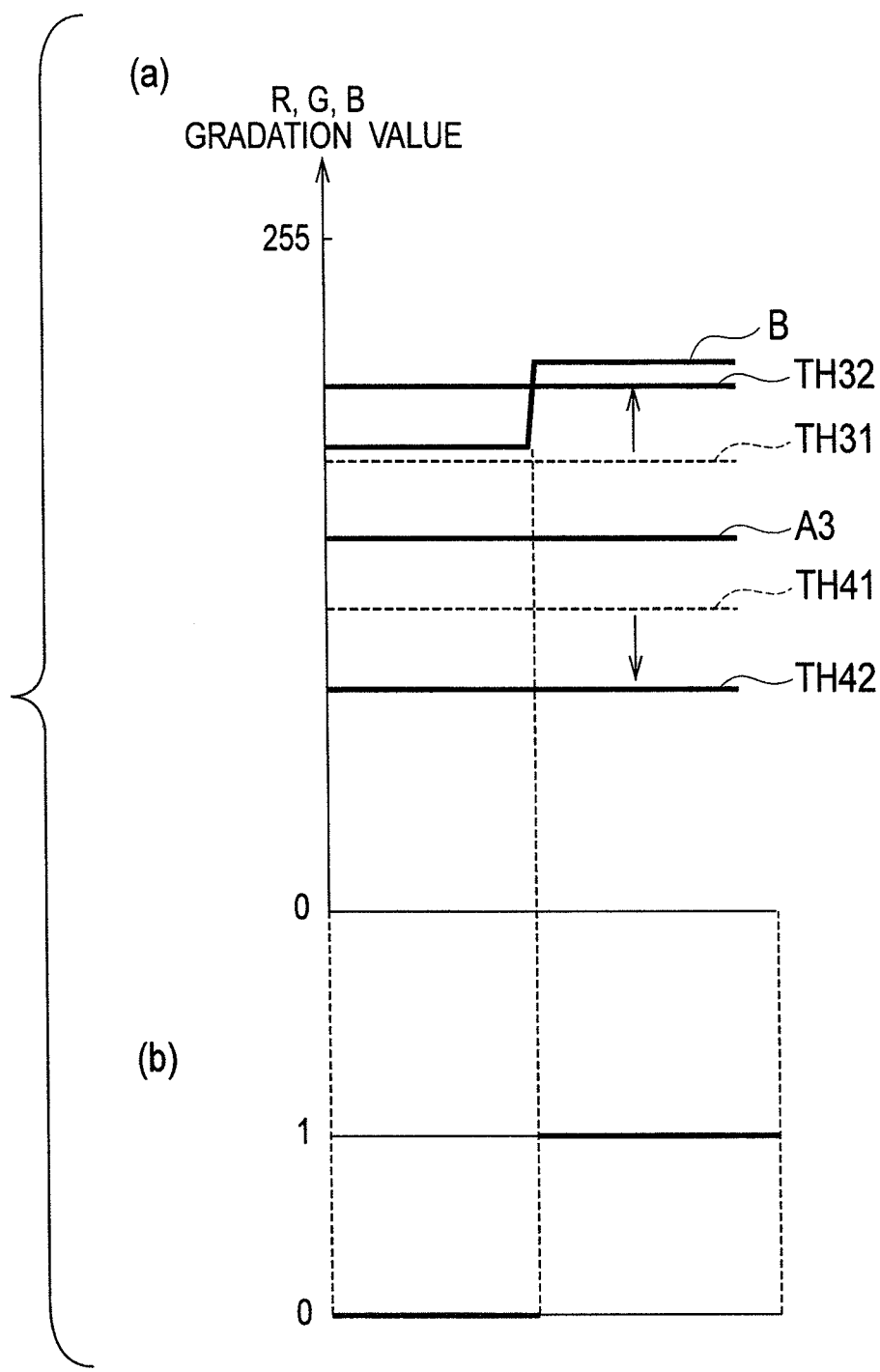
FIG. 8 is a diagram showing an example of updating of the threshold in the case where the number of pixels of the extracted object is not less than the predetermined proportion of all the pixels and binarization of the latest frame image.

In the case illustrated in FIG. 6, as illustrated in (a) of FIG. 8, for example, the current threshold TH31 is corrected and updated to a new threshold TH32, or a current threshold TH41 is corrected and updated to a new threshold TH42.

Back to FIG. 4, in step S415, the object extraction unit 22 executes a background subtraction process 2. In the background subtraction process 2, the latest frame image is binarized in the same manner as executed in the previous step S402 by using the absolute values of the difference values between the latest frame image and background image calculated in the previous step S402 and the threshold updated in the previous step S413.

In the case illustrated in FIG. 6 described above, the latest frame image B is binarized as illustrated in (b) of FIG. 8, for example.

To be specific, as illustrated in (b) of FIG. 8, part of the latest frame image whose absolute values of the difference values from the background image are smaller than the new threshold TH32 is binarized into 0 and is represented in black in the binarized image, for example. On the other hand, the part whose absolute values are larger than the threshold TH32 is binarized into 1 and is represented in white in the binarized image, for example.

Back to FIG. 4, in step S416, the object extraction unit 22 executes a background image correction process 2. In the background image correction process 2, the pixels which are recognized as the background as the results of the background subtraction process 2 executed in the previous step S415 are updated using the corresponding pixels of the latest frame image. On the other hand, the pixels recognized as the extracted object are added with the difference average calculated in the previous step S413 to be updated. By executing the correction process described above, the background image is corrected and updated.

Figure 9:
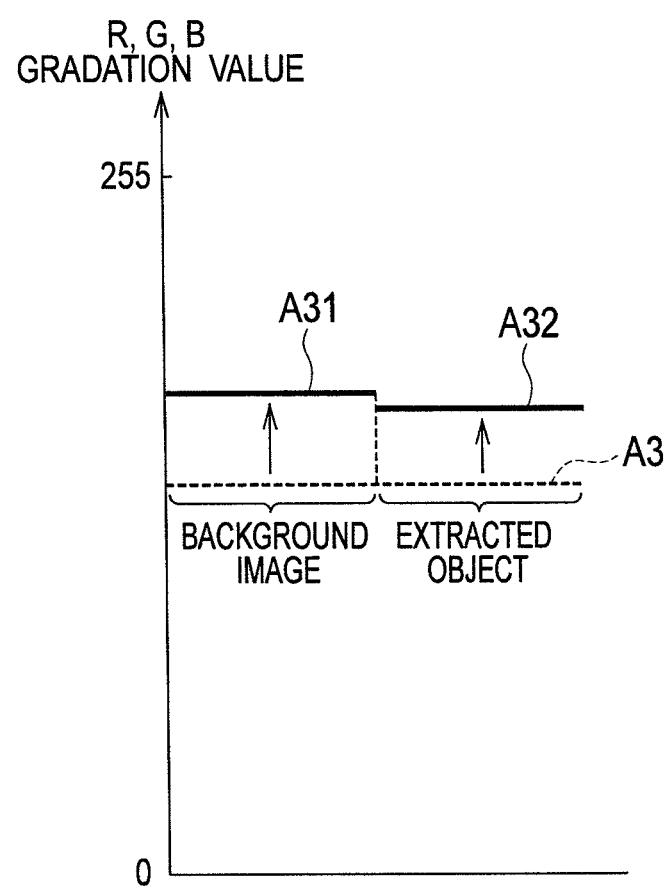
FIG. 9 is a diagram showing an example of updating of the background image in the case where the number of pixels of the extracted object is not less than the predetermined proportion of all the pixels.

In the case shown in (a) of FIG. 8, for example, as illustrated in FIG. 9, pixels of the background image A3 corresponding to the part recognized as the background are updated using the corresponding pixels of the latest frame image to a background image A31. On the other hand, pixels of the background image A3 corresponding to the part which is recognized as the extracted object are added with the difference average to be updated to a background image A32.

Back to FIG. 4, the object extraction unit 22 executes a threshold setting process in step S417. In the threshold setting process, the threshold of each pixel is reset to the default threshold value because the background image is corrected and updated in the background image correction process 2 shown in the previous step S416.

Subsequently, using the binarized image obtained in the background subtraction process 2 shown in the previous step S415, the processes shown in the aforementioned steps S405 to S408 are sequentially executed.

The object extraction unit 22 determines in the step S408 that the normal flag is False since the normal flag is set to False in the previous step S412, skips the aforementioned steps S409 and S410, and then executes the aforementioned step S411, thus terminating the series of processing.

In the process shown in the flowchart of FIG. 4, the proportion of the extracted object to all the pixels in the image, which serves as a branch condition in the determination process shown in the step S403, depends on the location conditions and the use conditions of the network camera 11 and the like.

Moreover, the blending ratios in the correction processes of the background image correction process 1 shown in the step S409 and the threshold correction process 1 shown in the step S410 depend on the situation of the installation place and use conditions of the network camera 11 and the like.

These parameters can be properly changed and adjusted by an instruction from the surveillance apparatus 13 when the network camera 11 is installed.

In the determination process shown in the step S403, the branch condition is the proportion of the extraction object to all the pixels of the image. However, the branch condition may be the sum of the amount of change of all pixels. Alternately, the results of operation using the proportion of the extracted object to all the pixels of the image and the sum of the amount of change of all pixels may be used as the branch condition to be determined with respect to the magnitude of difference between the latest frame image and the background image held by the background image holding unit 24.

In the process shown in the step S413, the threshold is corrected using the average of difference values from the previous frame image. The threshold may be just increased to a larger value than the previously set value when the proportion of the extracted object is high. However, in this method, the change in threshold is not in accordance with the amount of change in light, so that the accuracy in object extraction is low.

In the description of the embodiments, the image processing apparatus is incorporated in the network camera 11. However, the image processing apparatus may be provided outside of the network camera 11.

As described above, in the embodiments, the processes of correcting and updating the background image and threshold are changed depending on the proportion of the pixels detected as the extracted object to all the pixels of the latest frame image as the results of the detection of the extracted objects by the background subtraction process.

Accordingly, the background image and threshold can be properly corrected and updated even when a quick change in sunlight increases the difference between the background image and the latest frame image across the board.

According to the embodiments, the accuracy in detecting the extraction object can be improved even when the sun is blocked by clouds or comes out of clouds to cause a quick change in light. According to the embodiments, it is also possible to prevent increases in loads including increases in apparatus size and complexity.

When the proportion of the extracted object in the latest frame image is larger than the proportion previously set, the background subtraction process 2 shown in the previous step S415 is executed. This can provide an effect of removing fluctuation in the R, G, and B values due to changes in light intensity. It is therefore possible to continuously extract the extracted object properly.

Changes in light intensity can be also detected by a method using a particular area in the image. However, this method cannot accurately detect a change in light intensity when the extracted object is located in the previously specified particular area at the detection process.

On the other hand, in the background subtraction process 2, it is unnecessary to specify such an area used in detecting a change in light intensity. It is therefore possible to more accurately detect a change in light intensity compared with the detection method which uses a specified area.

Moreover, according to the aforementioned method of updating the entire background image when the light intensity changes, when there is an extracted object in the image, the background image is updated based on the improper background which includes the extracted object. This can cause false detection in the subsequent process of detecting an extracted object.

However, according to the embodiments, the background image is not replaced in the region corresponding to the part recognized as the extracted object while only the threshold is corrected. This makes it possible to properly detect an extracted object.

Furthermore, the threshold is corrected and updated in consideration of the number of pixels of the extracted object in the previous frame image, and the background image is corrected and updated based on the results of the background subtraction process executed using the updated threshold. It is therefore possible to reduce the influence of an extracted object even when the extracted object is included in the image.

What is claimed is:

1. An image processing apparatus comprising:
a background image holding unit configured to hold a background image;
a threshold table holding unit configured to hold a threshold;
a previous frame image holding unit configured to hold a previous frame image which is a frame image temporally prior to the latest image; and
an object extraction unit configured to perform a background subtraction process of calculating difference values between the background image and latest image and detecting a pixel whose calculated difference value is equal to or larger than the threshold as an extracted object and a process of judging the magnitude of difference between the background image and latest image, wherein
the object extraction unit is configured to
when determining that the magnitude of difference between the background image and latest image is less than a predetermined value, update the background image by adding the latest image to the background image in a predetermined ratio, when determining that the magnitude of difference between the background and latest image is not less than the predetermined value, update the threshold by calculating a difference average which is the average of the difference values between the previous frame image and the latest image and adding the absolute value of the calculated difference average to the threshold, update the background image by replacing the pixels of the latest image which are not recognized as the extracted object as the result of execution of the background subtraction process using the updated threshold, for the corresponding pixels of the background image as pixels of a new background image and replacing pixels of the background image corresponding to the pixels which are recognized as the extracted object with the pixels obtained by adding the difference average to the background image as pixels of the new background image, the background image holding unit holds the background image updated by the object extraction unit instead of the background image that the background image holding unit has held until that time, and the threshold table holding unit holds the threshold updated by the object extraction unit instead of the threshold that the threshold table holding unit has held until that time.

2. The image processing apparatus according to claim 1, wherein, when the extracted object is located in the previous frame image held by the previous frame image holding unit, the object extraction unit removes the pixels that have the largest difference values between the previous frame image and the latest image, the number of removed pixels being equal to a number previously set based on the number of pixels of the extracted object, calculates the difference values for the residual pixels, and calculates an average of the calculated difference values as the difference average.

3. The image processing apparatus according to claim 1, wherein the object extraction unit determines that the magnitude of difference between the background image and the latest image is less than the predetermined value when the proportion of the number of pixels detected as the extracted object is less than a predetermined proportion and determines that the magnitude of difference between the background image and the latest image is not less than the predetermined value when the proportion of the number of pixels detected as the extracted object is not less than the predetermined proportion.

4. An image processing method, comprising:

calculating difference values between a background image and a latest image;

detecting a pixel whose calculated difference value is not less than a predetermined threshold as an extracted object;

judging the magnitude of difference between the background image and the latest image based on the difference values;

when determining that the magnitude of difference between the background image and the latest image is less than a predetermined value, updating the background image by adding the background image to the latest image in a predetermined ratio;

when determining that the magnitude of difference between the background and the latest image is not less than the predetermined value, updating the threshold by calculating a difference average which is the average of the difference value of each pixel between the previous frame image and the latest image and adding the absolute value of the calculated difference average to the threshold; and updating the background image by replacing the pixels of the latest image which are not recognized as the extracted object as the result of execution of the background subtraction process using the updated threshold, for the corresponding pixels of the background image as pixels of a new background image and replacing the pixels of the background image corresponding to the pixels which are recognized as the extracted object in the latest image, with pixels obtained by adding the difference average to the background image as pixels of the new background image.

* * * * *